D. T. TIMBERLAKE.
TELESCOPIC DRIVING SHAFT.
APPLICATION FILED OCT. 26, 1918.
1,310,971.
Patented July 22, 1919.
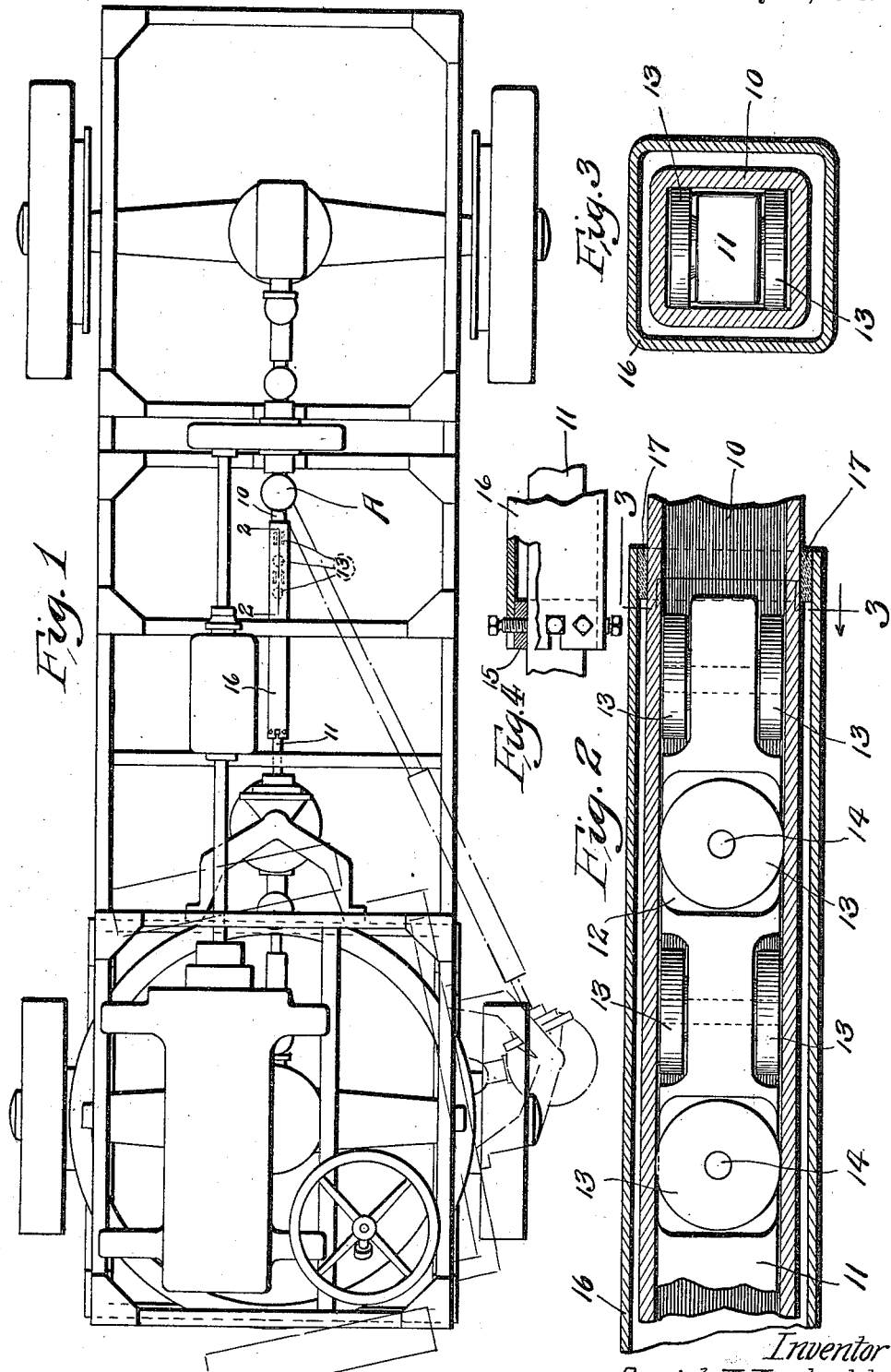
Inventor
Daniel T. Timberlake

UNITED STATES PATENT OFFICE.

DANIEL T. TIMBERLAKE, OF ST. LOUIS, MISSOURI, ASSIGNOR TO UNIVERSAL MOTOR TRUCK AND TRACTION ENGINE COMPANY, OF ST. JAMES, MISSOURI, A CORPORATION OF MISSOURI.

TELESCOPIC DRIVING-SHAFT.

1,310,971.   Specification of Letters Patent.   Patented July 22, 1919.

Application filed October 26, 1918.   Serial No. 259,744.

*To all whom it may concern:*

Be it known that I, DANIEL T. TIMBERLAKE, a citizen of the United States, residing at St. Louis, Missouri, have invented a certain new and useful Improvement in Telescopic Driving-Shafts, of which the following is a full, clear, and exact description, such as will enable others skilled in the art to which it appertains to make and use the same, reference being had to the accompanying drawings, forming part of this specification.

My invention relates generally to mechanical driving mechanism and more particularly to a telescopic driving shaft, and while a shaft of my improved construction can be advantageously used in various structures where a telescopic or extensible driving connection is required, it is particularly designed for use in connection with the driving mechanism of the traction engine disclosed in my Patent No. 905,481, dated December 1, 1908, and the motor truck disclosed in my copending application filed March 8, 1917, Serial No. 153,307.

The principal objects of my invention are, to provide a relatively simple driving shaft which is composed of a minimum number of parts thereby minimizing the cost of production, and further, to provide a shaft having a plurality of anti-frictional members, preferably rollers, which minimize the friction between the telescoping parts of the shaft and permit said parts to move freely and without undue strains particularly while said shaft is performing its driving functions.

With the foregoing and other objects in view, my invention consists in certain novel features of construction and arrangement of parts, hereinafter more fully described and claimed, and illustrated in the accompanying drawings, in which—

Figure 1 is a plan view of a motor truck of the four-wheel drive type and the main driving shaft thereof being equipped with a telescopic section constructed in accordance with my invention.

Fig. 2 is an enlarged vertical section taken approximately on the line 2—2 of Fig. 1.

Fig. 3 is a cross section taken on the line 3—3 of Fig. 2.

Fig. 4 is an elevational view partly in section of the forward end of the protecting cover or housing for my improved telescopic shaft.

Referring by numerals to the accompanying drawings which illustrate a practical embodiment of my invention, 10 designates the outer member of my improved shaft, the same being in the form of a tube preferably square in cross section, and arranged to slide freely through this tubular member is a shaft 11, preferably solid and square in cross section. Formed in the sides of this shaft are shallow recesses 12 which are preferably arranged in pairs with the members of each pair oppositely disposed with respect to each other and arranged in these recesses are anti-friction members 13 in the form of small wheels or disks.

The diameter of each of these disks is a slight degree less than the width of the opening within tube 10; consequently the peripheries of said disks will bear against the inner faces of the walls of the tube 10 during the longitudinal movement of the shaft 11 relative to said tube.

The members of each pair of wheels or disks are mounted on the ends of a shaft 14, the latter being journaled in the shaft 11.

By referring to Fig. 1, it will be noted that my improved telescopic shaft forms a part of the main driving shaft between the front and rear axles of a motor truck with the sleeve or tube 10 connected to a universal joint A in the main driving shaft and the shaft 11 extending forwardly from said tube 10 and being connected to that portion of the main driving shaft which is carried by the revolving frame which carries the front axle. Thus, as the front axle is swung toward the right or the left to steer the vehicle, the shaft 11 will move lengthwise through the tube 10, during which action the anti-friction members 13 will bear against the inner surfaces of the walls of the tube 11, and at the same time through torsional action, will transmit the rotary movement imparted to sleeve 10 to shaft 11 or vice versa.

To protect my improved shaft from dust, mud, moisture and the like, I arrange upon the shaft 11, a collar 15, the same being held in its adjusted position upon said shaft in any suitable manner, preferably by set screws, and detachably secured to said collar is one end of a metal tube 16, preferably of heavy galvanized or coated metal, the same being of sufficient length to inclose the greater portion of sleeve or tube 10. Arranged in the opposite end of this inclosing tube 16 and fitting snugly around the tube 10 is a packing ring 17 of leather, fiber or analogous material, which serves to exclude dust and the like from the space between said tube and the inclosing housing 16.

A telescopic driving shaft of my improved construction is relatively simple, comprises but few parts, operates freely and without undue strains under all conditions, and is particularly applicable for use in connection with motor trucks and the like.

It will be readily understood that minor changes in the size, form and construction of the various parts of my improved telescopic driving shaft may be made and substituted for those herein shown and described, without departing from the spirit of my invention, the scope of which is set forth in the appended claims.

I claim:

1. A telescopic driving shaft comprising a sleeve, a shaft arranged to move lengthwise therein, and a disk journaled upon said shaft, the periphery of which disk is adapted to engage the inner face of the sleeve.

2. A telescopic driving shaft comprising a sleeve, a shaft arranged for lengthwise movement therein, pairs of disks journaled upon said shaft, the edges of which disks are adapted to engage the inner face of the sleeve, the axis of one pair of disks being disposed substantially at right angles to the axis of the other pair of disks.

3. A telescopic driving shaft comprising a sleeve, provided with internally arranged angular faces, a shaft arranged to move through said sleeve, and disks carried by said shaft the edges of which disks are adapted to engage the angular faces of the sleeve.

4. In a driving shaft of the class described, a pair of members having telescopic connection, and a plurality of disks carried by the inner one of said members, the edges of which disks are adapted to bear against the inner face of the outer member.

5. In a driving shaft, a pair of telescopically connected members, and a plurality of pairs of anti-friction members carried by the inner one of said members and adapted to bear against the inner face of the outer telescopic member.

6. In a driving shaft, a pair of telescopically connected anti-friction disks arranged between said members, and a sleeve secured to the inner one of said members and inclosing the outer member.

7. A telescopic driving shaft comprising a sleeve, a shaft arranged to move lengthwise therethrough, anti-friction disks arranged between said shaft and sleeve, and a housing secured to said shaft and inclosing said sleeve.

8. A telescopic driving shaft comprising a sleeve, a shaft arranged for movement therein, and anti-friction disks arranged in pairs and journaled upon said shaft, the edges of which disks are adapted to engage the inner face of said sleeve.

In testimony whereof I hereunto affix my signature this 23d day of October, 1918.

DANIEL T. TIMBERLAKE.